United States Patent
Marinier

(10) Patent No.: US 7,408,905 B2
(45) Date of Patent: Aug. 5, 2008

(54) METHOD AND SYSTEM FOR COMPUTING THE OPTIMAL SLOT TO CELL ASSIGNMENT IN CELLULAR SYSTEMS EMPLOYING TIME DIVISION DUPLEX

(75) Inventor: Paul Marinier, Brossard (CA)

(73) Assignee: InterDigital Technology Corporation, Wilmington, DE (US)

( * ) Notice: Subject to any disclaimer, the term of this patent is extended or adjusted under 35 U.S.C. 154(b) by 890 days.

(21) Appl. No.: 10/851,541

(22) Filed: May 21, 2004

(65) Prior Publication Data

US 2004/0228309 A1   Nov. 18, 2004

Related U.S. Application Data

(63) Continuation of application No. 10/335,365, filed on Dec. 31, 2002, now Pat. No. 6,747,967.

(60) Provisional application No. 60/378,171, filed on May 14, 2002.

(51) Int. Cl.
  *H04B 7/212* (2006.01)
  *H04J 3/00* (2006.01)
(52) U.S. Cl. .................................... 370/337
(58) Field of Classification Search ............ 370/337, 370/330, 280, 310, 347, 336, 224, 232, 316, 370/380, 368, 265; 455/427, 428, 429, 452, 455/450, 446, 522, 63, 67, 69
  See application file for complete search history.

(56) References Cited

U.S. PATENT DOCUMENTS

| | | | |
|---|---|---|---|
| 5,594,720 A | 1/1997 | Papadopoulos et al. | |
| 5,602,836 A | 2/1997 | Papadopoulos et al. | |
| 5,936,947 A | 8/1999 | Fujii | |
| 6,016,311 A | 1/2000 | Gilbert et al. | |
| 6,240,076 B1* | 5/2001 | Kanerva et al. | 370/330 |
| 6,304,593 B1 | 10/2001 | Alouini et al. | |
| 6,308,294 B1 | 10/2001 | Ghosh et al. | |
| 6,334,057 B1 | 12/2001 | Malmgren et al. | |
| 6,738,350 B1* | 5/2004 | Gao et al. | 370/232 |
| 6,747,967 B2* | 6/2004 | Marinier | 370/337 |
| 2002/0164989 A1 | 11/2002 | Skillermark et al. | |

FOREIGN PATENT DOCUMENTS

| | | |
|---|---|---|
| EP | 1122895 | 8/2001 |
| EP | 1122895 A1 | 8/2001 |
| JP | 07-059151 | 3/1995 |
| JP | 10-094044 | 4/1998 |
| WO | 01/01188 | 1/2000 |
| WO | 01/99454 | 12/2001 |

* cited by examiner

*Primary Examiner*—Wing F. Chan
*Assistant Examiner*—Prenell P Jones
(74) *Attorney, Agent, or Firm*—Volpe and Koenig, P.C.

(57) ABSTRACT

A system and method to optimize the number of uplink and downlink slots, given the maximum number of crossed slots between any two cells is disclosed. The present invention effectively assigns a direction (i.e. uplink or downlink) to every slot in every cell of the system, taking into account the trade-off between: a) avoiding base-to-base or mobile-to-mobile interference; and b) matching the slot assignment of every cell as closely as possible to the local traffic conditions. The present invention assigns users to slots according to their transmission power requirements in order to allow conflicting slot-to-cell assignments between two cells in the same geographic region.

12 Claims, 4 Drawing Sheets

| FIG. 2 |
|---|
| FIG. 2A |
| FIG. 2B |

300

302

MAKE A LIST OF ALL POSSIBLE SETS OF VALUES

FOR $\{N_c^u, N_c^d\}_{c=1}^{M_c}$ WHICH SATISFY THE FOLLOWING CONSTRAINTS:

1) $N_{min}^u \leq N_c^u \leq N_{max}^u$
2) $N_{min}^d \leq N_c^d \leq N_{max}^d$
3) $N_c^u \leq N_c^d \leq N_t$
4) $\max(N_{c1}^u + N_{c2}^d - N_t, N_{c2}^u + N_{c1}^d - N_t) \leq X_{c1,c2}$ FOR EVERY PAIR OF CELLS (c1,c2).

304

DENOTE BY $S_1, S_2, S_3, \ldots S_p$ THE POSSIBLE SETS OF VALUES OBTAINED. P IS THE TOTAL NUMBER OF POSSIBLE SETS OF VALUES. THE $i^{th}$ SET OF VALUES, $S_i$, IS WRITTEN:

$$S_i = \{(N_c^u)_i, (N_c^d)_i\}_{c=1}^{M_c}$$

306

START WITH i = 1 AND $F_c^{min} = \infty$ AND $i^0 = 1$

308

COMPUTE $F_c^i = K_u \times \max(0, \min(T_c^u - (N_c^u)_i, N_{max}^u))$ $+ K_d \times \max(0, \min(T_c^d - (N_c^d)_i, N_{max}^d))$

METHOD AND SYSTEM FOR COMPUTING THE OPTIMAL SLOT TO CELL ASSIGNMENT IN CELLULAR SYSTEMS EMPLOYING TIME DIVISION DUPLEX

CROSS REFERENCE TO RELATED APPLICATION(S)

This application is a continuation of U.S. patent application Ser. No. 10/335,365, filed Dec. 31, 2002, now U.S. Pat. No. 6,747,967 which claims priority from U.S. Provisional Application No.60/378,171 filed May 14, 2002, which are incorporated by reference as if fully set forth.

BACKGROUND OF THE INVENTION

The present invention relates to wireless communications. More specifically, the present invention is related to third generation (3G) cellular systems employing time-division duplex (TDD) for separating base-to-mobile and mobile-to-base communications.

Wireless time-division cellular systems generally divide the time axis into intervals of equal durations called frames. Systems employing the TDD scheme divide time frames into a finite number ($N_T$) of intervals of equal durations, called slots, and allow a cell to use some or all of the slots for uplink (mobile-to-base) or downlink (base-to-mobile) transmissions. The slot assignment of a cell defines how each slot is used by this cell. There are three possible ways for a cell to use a slot: 1) uplink transmissions; 2) downlink transmissions; or 3) the slot is not used at all.

The slot assignment of a cell can be varied by the system in order to adapt to the requirements of the traffic. For example, the system may modify the assignment of one slot from uplink to downlink if the amount of downlink traffic increases while the uplink traffic decreases. In addition, different cells of a system generally do not need to have the same slot assignment. If traffic characteristics in one geographical area are different from another area, the cells covering those areas may have different assignment so as to best adapt to local traffic conditions.

The timeslot assignment $A_c$ of a cell c is represented by a set of $N_T$ values, where the $S^{th}$ value of the timeslot assignment ($A_{c,s}$), represents the usage of the sth slot in this cell. The number of slots used for uplink and downlink transmissions are denoted $N_c^u$ and $N_c^d$, respectively.

FIG. 1 illustrates conflicting slot assignments for two cells in the same vicinity. A first cell 10 has a first time frame 12 which includes a plurality of timeslots $N_{A1}$ through $N_{AT}$. The time slots are used for uplink or downlink communications or not all. For the present example, assume that time slot $N_{A3}$ is used for uplink communications between a mobile unit 18 and a base station 11. A second cell 14, including a second base station 20, is in close proximity to the first cell 10. This cell communicates using a second time frame 15 including a plurality of timeslots $N_{B1}$-$N_{BT}$. In the second cell, the slots are also used for uplink or downlink communications or not all. For the present example, assume that timeslot $N_{B3}$ is used for downlink communications. Because of the cell's proximity to each other, there is a strong possibility of the second cell 14 causing interference with the communications between the base station 11 of the first cell 10 and mobile unit 18, which leads to system degradation (base-to-base interference scenario). Depending on the degree of isolation, in terms of path loss between the cells, this degradation may or may not be acceptable. The first cell 10 may have to assign the mobile unit 18 to another slot and mark this slot as unusable as an uplink slot in its cell, which reduces the capacity of the system.

Mobile-to-mobile interference scenarios may also occur due to uplink and downlink slot allocations for mobiles that are in close proximity. However, mobile-to-mobile interference is much more unpredictable than base-to-base interference and may be mitigated by means of an escape mechanism which reallocates user's codes to another timeslot where the interference is less severe.

Therefore, it is important to determine the best slot assignments for every cell, taking into account the conflicting requirements of adapting to local traffic variations and avoiding interference due to different time slot assignments between neighboring cells. "Crossed slots" occur when neighboring cells unconnectedly utilize the opposite slot assignments. A first cell may use the slot assignment for uplink communications and another cell uses the same slot assignment for downlink communications. This results in a possibility that the downlink transmission of one cell will interfere with the uplink reception of another cell. Therefore, it would be desirable to have a system which takes into account the time slot assignment of neighboring cells and efficiently coordinates time slot assignments to increase the overall performance and operation of each cell.

SUMMARY

The present invention is a system and method to optimize the number of uplink and downlink slots, given the maximum number of crossed slots between any two cells. The present invention determines the maximum number of crossed slots between any two cells and effectively assigns a direction, either uplink or downlink, to every slot in every cell of a system, taking into account the trade-off between a) avoiding base-to-base or mobile-to-mobile interference; and b) matching the slot assignment of every cell as closely as possible to the local traffic conditions. The present invention assigns users to slots according to their transmission power requirements in order to allow conflicting slot-to-cell assignments between two cells in the same geographic region.

DETAILED DESCRIPTION OF THE PREFERRED EMBODIMENTS

Figure 1:
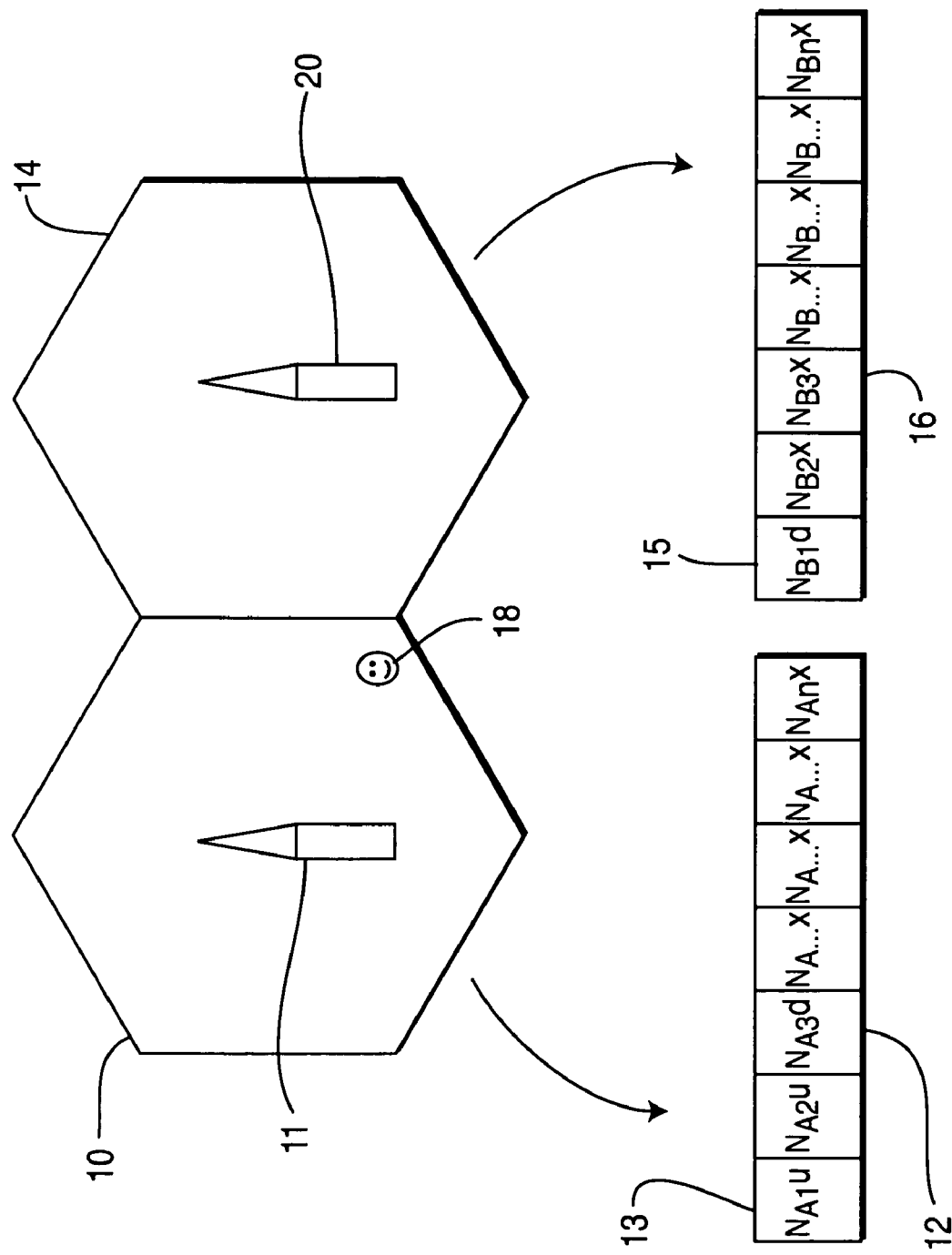
FIG. 1 illustrates the problem of two adjacent cells wherein a first cell is in communication with a user equipment (UE) and a second cell's downlink interferes with the communication of the UE in the first cell.

The present invention will be described with reference to the drawing figures wherein like numerals represent like elements throughout.

The present invention takes into account the following two premises. First, the maximum number of crossed slots between two cells increases when their mutual path loss isolation increases; or conversely, when the isolation decreases the number of crossed slots that can be tolerated decreases. Second, the cost associated with the choice of a particular slot assignment for a cell should be a function of the traffic that cannot be served (i.e. blocked or delayed) due to the choice of slot assignment.

It should be well understood by those skilled in the art that cells which are more isolated can afford to have a larger number of crossed slots. The term "isolation" is a generic term for the path loss between two base stations as related to base-to-base interference. It may also refer to a metric associated with the distribution of path losses between any pair of possible positions for two mobiles respectively connected to two cells (as related to mobile-to-mobile interference). In the latter case, the metric considered could be some percentile of the distribution.

If there is a very large isolation between two cells, the cells may choose their slot assignments autonomously. In such a case, it is obvious that the base-to-base or mobile-to-mobile interference would be insignificant. At the other extreme, cells that would be quasi co-located can not afford to have even a single pair of crossed slots. The amount of base-to-base interference produced would hamper or make any communications unsustainable for these slots.

The present invention may, however, be most advantageously applied to situations which fall between these two extremes where a limited number of crossed slots would be allowable by employing novel radio resource management (RRM) techniques. The wireless transmit receive units (WTRUs) which are close to their serving Node B, are preferentially assigned to the crossed slots, thus minimizing the probability of mobile-to-mobile interference.

The maximum number of crossed slots which can be tolerated is a function of many factors, including but not limited to, the geography of the users surrounding the Node B, the mobility of WTRUs and RRM performance. The maximum number of crossed slots between two cells (c1 and c2) is represented by $(X_{c1, c2})$. The present invention assumes that the maximum number of crossed slots between any pair of cells is known. In practice, an operator would decide an appropriate value for $(X_{c1, c2})$ by considering the extent to which the cells (c1 and c2) are isolated. This invention will also explain a possible systematic method to determine the $(X_{c1,c2})$.

The actual cost of a slot assignment (Fc) for a cell may be defined according to the amount of offered traffic that cannot be served because of the present slot assignments. It is irrelevant how a slot is assigned if the slot is not used due to lack of traffic. The cost function may also be expressed as a representation of the traffic blocked or delayed because of choice of specific slot assignment in a cell (c).

The cost function and the number of crossed slots are closely related to each other. It is desirable to minimize the overall cost function F, which is the sum of the individual cost functions Fc from every cell. If the slot assignments of every cell could be independently adjusted from each other, it would be an easy task because it would just be matching the number of uplink/downlink slots of every cell to its traffic characteristics. Unfortunately, the cells are not isolated and cell isolation must be taken into account. The lack of isolation causes the cells to interfere with each other as more conflicting slot assignments between two cells were utilized. This interference becomes intolerable if more than one crossed slot (i.e. $X_{c1,c2} > 1$) exists between cells c1 and c2. Thus the maximum number of crossed slots represents a constraint that must be considered when seeking the optimal solution that minimizes the cost function F.

The following values must be known to implement the invention: 1) the number of cells in the system (Mc); 2) the number of slots available for traffic in a TDD frame (Nt); 3) the minimum and maximum numbers of uplink slots available for traffic in a cell ($N_{min}^u$ and $N_{max}^u$, respectively); and 4) the minimum and maximum numbers of downlink slots available for traffic in a cell ($N_{min}^d$ and $N_{max}^d$, respectively). Then for each pair of cells (c1, c2), it is necessary to determine the maximum number of crossed slots $X_{c1, c2}$ the system can tolerate. This can be achieved in different ways: 1) such as in a coarse manner, by manually setting $X_{c1, c2}=0$ if the cells c1 and c2 are relatively "close" to each other, and $X_{c1, c2}=$Nt if the cells c1 and c2 are "far" from each other; 2) in a systematic manner, which is described below in paragraph 34; and 3) a "manual adjustment," in which the operator makes adjustments according to heuristic rules based on field experience, for example, possibly with an established system it was determined that with indoor cells placed 200 meters apart, the system can tolerate 4 allowed crossed slots without any problem.

The optimal slot-to-cell assignment is found when the number of uplink ($\overline{N_c^u}$) and downlink ($\overline{N_c^d}$) slots to assign in every cell c is found. The system assigns $\overline{N_{cu}}$ uplink slots to cell c, $\overline{N_c^d}$ downlink slots to cell c, and the (Nt $-\overline{N_c^u}-\overline{N_c^d}$) remaining slots are not used in cell c. The system will always assign uplink slots in the same order of preference for all cells. For example, suppose that there are Nt=8 slots and the order of preference is (s1, s2, s3, s4, s5, s6, s7, s8). Then if $\overline{N_c^u}=3$, the system will assign s1, s2, s3 to the uplink in cell c. The system will also always assign downlink slots in the same order of preference for all cells, and this order must be the reverse of the order used for the uplink slots. In the above example, if we have $\overline{N_c^d}=4$ the system will assign slots s8, s7, s6 and s5 to the downlink in cell c. Slot s4 would not be used at all in cell c. The order of preference for allocating slots may be determined by the operator arbitrarily.

The set of numbers $\{\overline{N_c^u}, \overline{N_c^d}\}_{c=1}^{Mc}$ mentioned above constitute the solution to the following optimization problem:

Minimize:

$$F \equiv \sum_{c=1}^{Mc} F_c;$$

Equation 1 where F is the sum of all cost functions and Fc is the cost function associated to the slot assignment of a specific cell c, which is defined by Equation 2:

$$F_c = Ku \times \max(0, \min(T_c^u - N_c^u, N_{max}^u)) + Kd \times \max(0, \min(T_c^d - N_c^d, N_{max}^d))$$

Equation 2 where $T_c^u$ and $T_c^d$ denotes the number of slots required to serve all uplink and downlink traffic, respectfully, in cell c; Ku and Kd are weighting factors which permit a system operator to give more importance to either uplink or downlink traffic as desired; $N_c^u$ and $N_c^d$ are the number of slots used for uplink and downlink transmissions respectively in cell c; and $N_{max}^u$ and $N_{max}^d$ are the maximum number of uplink or downlink slots that can be assigned to a given cell. The above equation must be over the $\{N_c^u\}_{c=1}^{Mc}$ and $\{N_c^d\}_{c=1}^{Mc}$ values, subject to the following constraints: 1) $N_{min}^u \leq N_c^u \leq N_{max}^u$, where the limits $N_{min}^u$ and $N_{max}^u$ are the number of minimum and maximum uplink slots, respectively; 2) $N_{min}^d \leq N_c^d \leq N_{max}^d$, where the limits $N_{min}^d$ and $N_{max}^d$ are the number of minimum and maximum downlink slots, respectively slots; 3) $N_c^u + N_c^d \leq N_t$, where the number of uplink and downlink slots of cell should be less than the total number of slots available in a particular cell; and 4) $\max(N_{c1}^u+N_{c2}^d-N_t, N_{c2}^u+N_{c1}^d-N_t) \leq X_{c1,c2}$ for every pair of cells (c1, c2). This last constraint expresses the condition that two cells (c1, c2) cannot have more than $X_{c1,c2}$ crossed slots. The set of values for $\{N_c^u, N_c^d\}_{c=1}^{Mc}$ that minimize F and satisfy all the above-mentioned constraints is denoted $\{\overline{N_c^u}, \overline{N_c^d}\}_{c=1}^{Mc}$ and constitute the solution sought.

Figure 2B:
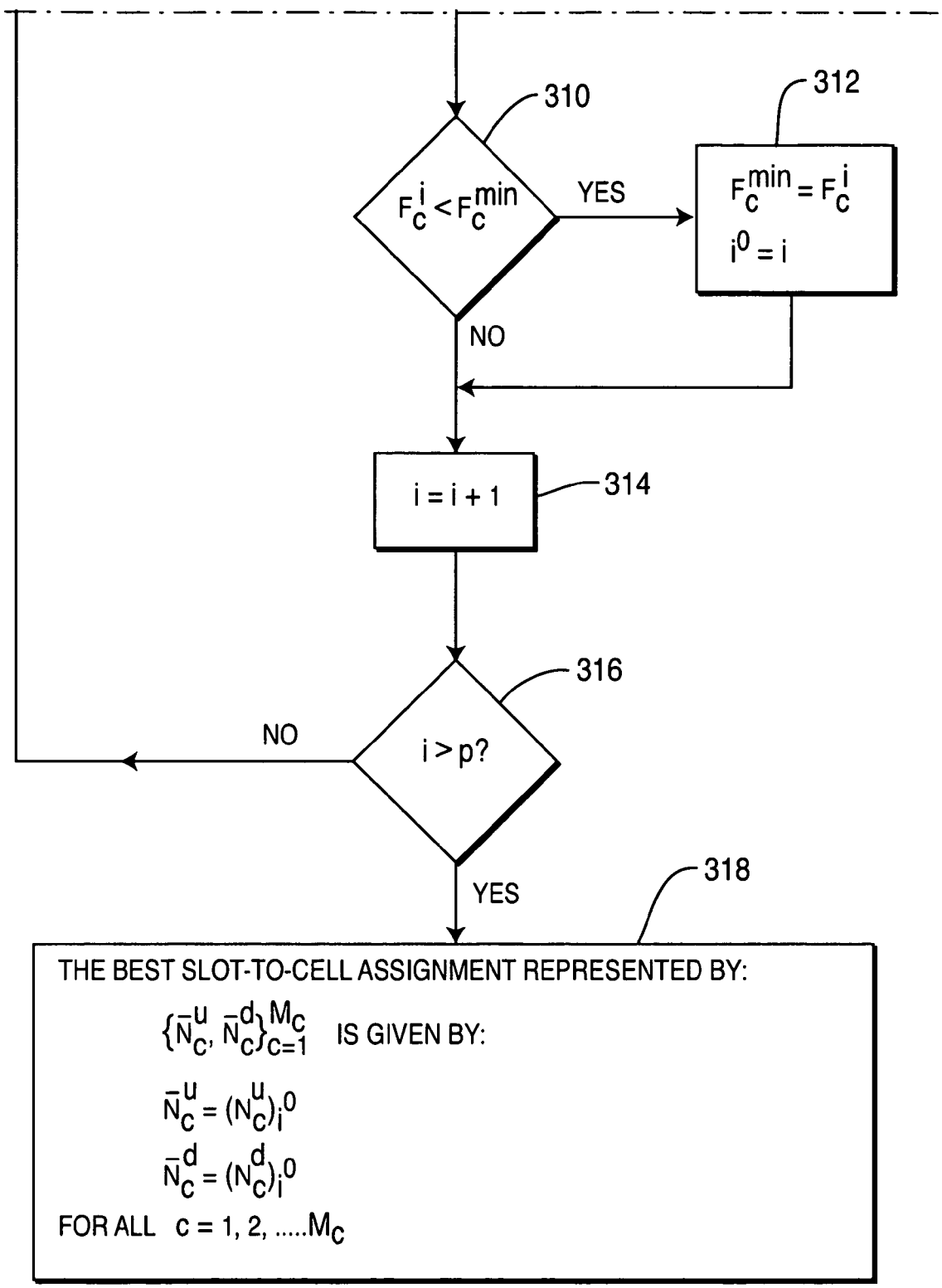
FIG. 2 is a flow diagram for calculating $\{\overline{N_c^u}, \overline{N_c^d}\}_{c=1}^{Mc}$ in accordance with the present invention.

To further clarify the above, reference is made to FIG. 2 which shows a flow chart 300 comprising steps for obtaining $\{\overline{N_c^u}, \overline{N_c^d}\}_{c=1}^{Mc}$. To begin, a list of all possible sets of values for $\{\overline{N_c^u}, \overline{N_c^d}\}_{c=1}^{Mc}$ are determined in step 302, as explained in detail above. Then, the possible set of values obtained are denoted by S1, S2, S3, . . . Sp and the ith set of values, Si, is written as $Si = \{\overline{N_c^u}, \overline{N_c^u}\}_{c=1}^{Mc}$ (step 304). Then, in step 306, start with i=1 and $Fc^{min}$=infinity and $i^0$=1. Then, in step 308, compute $F_c$=Ku×max(0,min($T_c^u-N_c^u,N_{max}^u$))+Kd×max(0, min($T_c^d-N_c^d,N_{max}^d$)) (i.e. equation 2). Next, in step determine whether $Fc^i$ is greater than $Fc^{min}$. If yes, set $Fc^{min}$ equal to $Fc^i$ and $i^0$equal to i in step 312 and then proceed to step 314. If not, proceed directly from step 310 to step 314 where i equals i+1. From step 314 proceed to step 316 to determine whether i is greater than P. If not, return to step 308. If so, proceed to step 318. In step 318, the best slot-to-cell assignment represented by $\{\overline{N_c^u}, \overline{N_c^d}\}_{c=1}^{Mc}$ is given by the formulas shown in step 318 of FIG. 2 for all c=1,2, . . . Mc.

The most obvious procedure to solve the optimization problem employs a "brute-force" technique, whereby the value of F is computed for every possible set of values $\{N_c^u, N_c^d\}_{c=1}^{Mc}$ satisfying the four above constraints. This approach is only practical for relatively small values of Mc or Nt, but could become computationally intensive otherwise.

Figure 3:
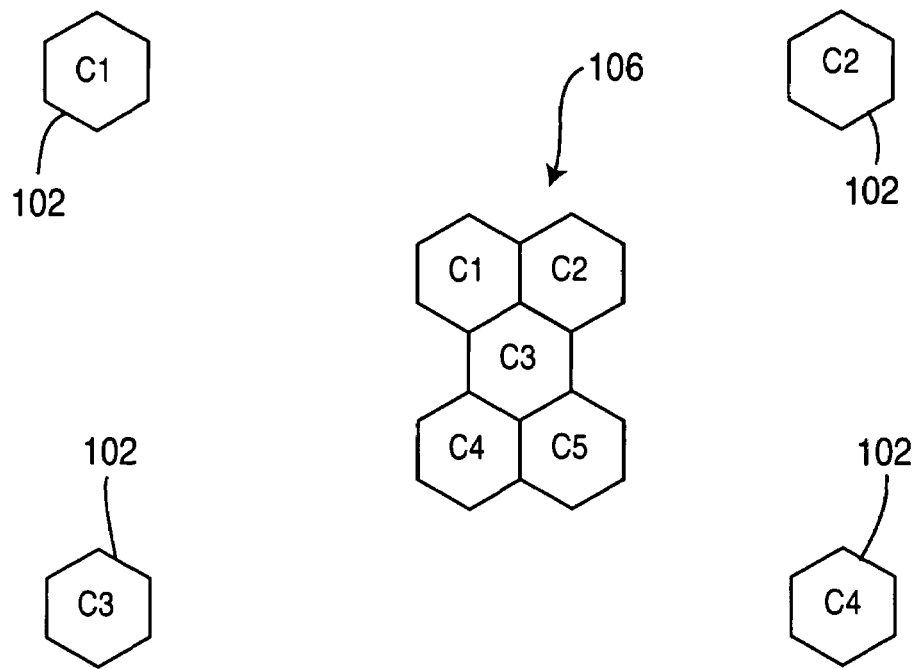
FIG. 3 illustrates an "island cluster" of primary stations surrounded by distantly located outer primary stations.

Referring now to FIG. 3, there is an example of an "island cluster" of inner cells 106 whose cell patterns have extensive interrelations possibilities. Therefore, for cells 106, $X_{ci,cj}$ [where (i,j) is any pair of different cells among (c1, c2, c3, c4, and c5)] should be set to a small number because the degree of isolation between cells 106 is minimal. An outer group of cells 102, in contrast, has a higher degree of isolation and may therefore have a higher value of $X_{ci,cj}$ [where (i,j) is any pair of different cells among (c1, c2, c3, c4, and c5 belonging to group 102)].

Referring again to a hypothetical example having two cells c1 and c2, the "systematic manner," as mentioned above, may be used to determine the maximum number of crossed slots between two cells ($X_{c1,c2}$). When using the systematic method to determine the maximum number of crossed slots ($X_{c1,c2}$) between cells c1 and c2, the maximum range, R, of the cells should be known. The maximum range of a cell is the maximum distance between a mobile connected to this cell and a base station serving that cell. In the case that the two cells, c1 and c2 do not have the same maximum range, R may be set to the larger of the two values. The distance between the two cells, c1 and c2 may be represented by $D_{c1,c2}$. A parameter, ρ is set by the operator. It has a maximum value of 1.0 and a minimum value of 0.0. The ρ value represents the minimum allowable ratio between: a) the distance between a mobile connected to cell c1 and a mobile connected to cell c2 when those mobiles use the same slot in opposite directions; and b) the distance between base station serving cell c1 and base station serving cell c2. When the value of ρ decreases, the probability of allowing crossed slots between two cells increases, while increasing the value of ρ has the opposite effect. Using the variables outlined above, the maximum number of crossed slots $X_{c1,c2}$ can be determined using Equation 3:

$$X_{c1,c2} = Nt \times \min(1, \text{round}((1-\rho)^2(D_{c1,c2})^2/4R^2));  \quad \text{Equation 3}$$

where $\text{round}((1-\rho)^2(D_{c1,c2})^2/4R^2))$ denotes the operation of rounding $((1-\rho)^2(D_{c1,c2})^2/4R^2))$ to the nearest integer or alternatively, $\text{round}((1-\rho)^2(D_{c1,c2})^2/4R^2))$ can be replaced by $\text{floor}((1-\rho)^2(D_{c1,c2})^2/4R^2))$, which denotes the operation of getting the largest integer inferior or equal to $((1-\rho)^2(D_{c1,c2})^2/4R^2))$.

Referring again to equation (2), the reason for the presence of the terms $N_{max}^u$ and $N_{max}^d$ is that we want to take into account only the cost due to the choice of the slot assignment and not the cost due to the sheer lack of capacity in a particular area. For example, if serving the downlink traffic in a particular cell would require 32 slots and the maximum number of downlink slots in an assignment is only 14, then the downlink component of the cost function should be limited to 14 since it is not possible with any slot assignment to serve all the offered downlink traffic.

It should be understood by those of skill in the art that it is typically impractical to modify the slot assignments at a high frequency because of the need for handing over connections from affected slots to other slots. Accordingly, the traffic estimates used in Equation 2 should be based on long-term averages consistent with the frequency of modifications of the slot assignment. For example, if the slot assignments are to be modified only every 30 minutes, the offered traffic estimates should be averaged over the same temporal period, (one with the same order of magnitude.) Estimates can be derived based on various metrics such as traffic volume measurements, buffer occupancies, and frequency of blocked calls by admission control.

Another embodiment of the present invention is to assign only users with the lowest power requirements to conflicting slot assignments. That is, downlink slot(s) conflicting with uplink slot(s) in neighboring cells can be managed by setting a limit on the base station power per physical channel as defined by a code and a timeslot for any user occupying those slots. Conversely, for uplink slot(s) this is managed by setting a limit on the uplink power per slot. The amount of performance degradation in the system will be reduced through two effects. The first effect is the interference produced by a transmitter is directly proportional to its transmission. Second, by limiting the transmission power of a user one limits its maximum distance from its serving base station, thereby reducing the probability that it either produces interference to, or sustain significant interference from another user connected to the neighboring base station that has a conflicting slot assignment.

It should be noted that other algorithms may be utilized to achieve the cost function and that these alternative algorithms do not take away from the spirit of the present invention.

Figure 4:
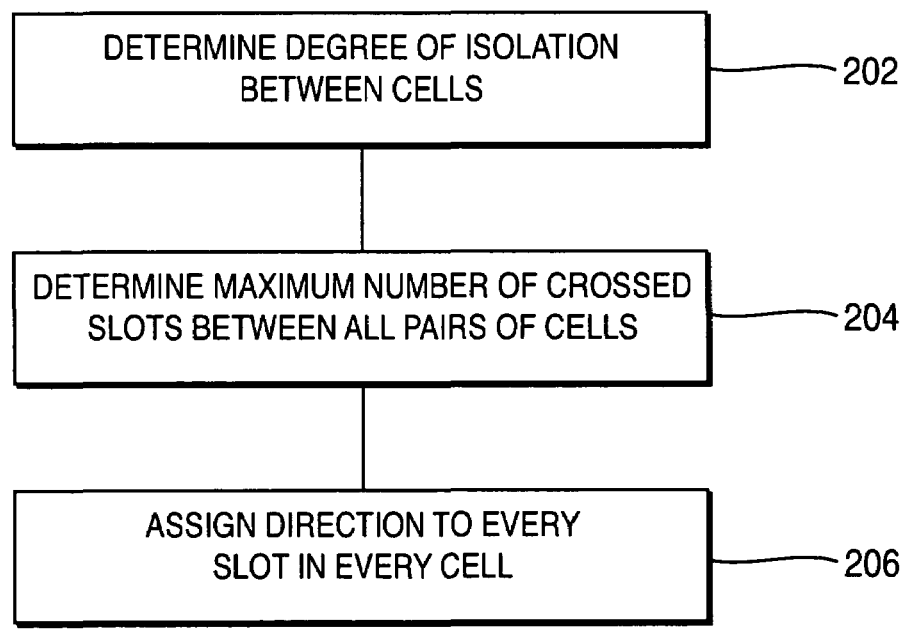
FIG. 4 is a flow diagram for implementing the present invention.

Referring now to FIG. 4, there is shown a method 200 for implementing the present invention. For the sake of brevity and because implementation of the invention is explained above, the steps of method 200 will not be described in detail. To begin, in step 202, a degree of isolation between cells is determined as explained above. As explained, the degree of isolation between cells is proportional to the maximum number of crossed slots between those same cells. Next, in step 204, the maximum number of crossed slots is determined. Then, in step 206, a direction, either uplink or downlink, is assigned to every slot in every cell of the system.

Although the present invention has been described in detail, it is to be understood that the invention is not limited thereto, and that various changes can be made therein without departing from the spirit and scope of the invention, which is defined by the attached claims.

What is claimed is:

1. A base station for optimizing allocation of a plurality of time slots in a region that is divided into a plurality of cells, and each cell is served by the base station, the base station comprising:
   a processor configured for setting a maximum number of crossed time slots between adjacent cells, a crossed time slot being defined as a time slot that is allocated as an uplink timeslot in one cell and a downlink timeslot in an adjacent cell;
   the processor further configured for allocating each of the plurality of time slots as either an uplink time slot or a downlink time slot, such that the number of crossed time slots between adjacent cells does not exceed the maximum number.

2. The base station of claim 1 wherein said maximum number of crossed time slots is based on the deegree of isolation between adjacent cells.

3. The base station of claim 2 wherein the degree of isolation is determined based on at least one of: geographic features surrounding base stations; mobility of wireless transmit/receive units (WTRUs) served by the base stations; and radio resource management function of the base stations.

4. The base station of claim 1 wherein said the maximum number of crossed time slots is based on at least one of: a distance between two wireless transmit/receive units (WTRUs) connected to adjacent base stations and a distance between adjacent base stations.

5. The base station of claim 1 wherein the processor is further configured for calculating a cost incurred due to each crossed time slot allocation, and time slots are allocated such that costs are minimized.

6. The base station of claim 5 wherein a traffic delay due to the crossed time slot allocation is considered in the calculation of the cost.

7. A method for optimizing allocation of time slots in a region that is divided into a plurality of cells, and each cell is served by a base station, the method comprising:
   setting a maximum number of crossed time slots between adjacent cells, a crossed time slot comprising a time slot that is allocated as an uplink time slot in one cell and as a downlink time slot in an adjacent cell; and
   allocating each time slot as either an uplink time slot or as a downlink time slot, wherein the number of crossed time slots between adjacent cells does not exceed the maximum number.

8. The method of claim 7 wherein the maximum number of crossed time slots is based on the degree of isolation between adjacent cells.

9. The method of claim 8 wherein the degree of isolation is determined based on at least one of: geographic features surrounding base stations; mobility of wireless transmit/receive units (WTRUs) served by the base stations; and radio resource management function of the base stations.

10. The method of claim 7 wherein the maximum number of crossed time slots is based on at least one of: a distance between two wireless transmit/receive units (WTRUs) connected to adjacent base stations and a distance between adjacent base stations.

11. The method of claim 7 further comprising calculating a cost incurred due to each crossed time slot allocation, whereby time slots are allocated such that costs are minimized.

12. The method of claim 11 wherein a traffic delay is considered in the calculation of the cost.

* * * * *